US011784739B2

(12) United States Patent
Nomura

(10) Patent No.: US 11,784,739 B2
(45) Date of Patent: *Oct. 10, 2023

(54) WAVELENGTH-TUNABLE PLUGGABLE OPTICAL MODULE, OPTICAL COMMUNICATION SYSTEM AND WAVELENGTH CHANGE METHOD OF WAVELENGTH-TUNABLE PLUGGABLE OPTICAL MODULE

(71) Applicant: NEC Corporation, Tokyo (JP)

(72) Inventor: Rintaro Nomura, Tokyo (JP)

(73) Assignee: NEC CORPORATION, Tokyo (JP)

(*) Notice: Subject to any disclaimer, the term of this patent is extended or adjusted under 35 U.S.C. 154(b) by 156 days.

This patent is subject to a terminal disclaimer.

(21) Appl. No.: 17/220,980

(22) Filed: Apr. 2, 2021

(65) Prior Publication Data

US 2021/0226717 A1 Jul. 22, 2021

Related U.S. Application Data

(63) Continuation of application No. 16/815,774, filed on Mar. 11, 2020, now Pat. No. 10,998,999, which is a
(Continued)

(30) Foreign Application Priority Data

Mar. 5, 2015 (JP) .................. 2015-043203

(51) Int. Cl.
*H04J 14/02* (2006.01)
*H04B 10/572* (2013.01)
(Continued)

(52) U.S. Cl.
CPC .............. *H04J 14/021* (2013.01); *G02B 6/42* (2013.01); *G02B 6/4215* (2013.01); *H04B 10/40* (2013.01);
(Continued)

(58) Field of Classification Search
CPC ........ H04J 14/021; H04J 14/022; G02B 6/42; G02B 6/4215; G02B 6/29395; H04B 10/40; H04B 10/572
(Continued)

(56) References Cited

U.S. PATENT DOCUMENTS 7,794,157 B2  9/2010 Hudgins et al.
2002/0126367 A1  9/2002 Kuwahara et al.
(Continued)

FOREIGN PATENT DOCUMENTS

CN  103001703 A  3/2013
CN  204031181 U  12/2014
(Continued)

OTHER PUBLICATIONS

Forysiak, W. and Govan, D. S., "Progress Toward 100-G Digital Coherent Pluggables Using InP-Based Photonics," Journal of Lightwave Technology, vol. 32, No. 16, pp. 2925-2934 (Aug. 15, 2014).
(Continued)

*Primary Examiner* — Juan A Torres
(74) *Attorney, Agent, or Firm* — Sughrue Mion, PLLC

(57) ABSTRACT

A pluggable electric connector can communicate a communication data signal and a control signal with an optical communication device. An optical signal output unit is configured to be capable of selectively output a wavelength of an optical signal. An optical power adjustment unit-can adjust optical power of the optical signal. A pluggable optical receptor can output the optical signal to an optical fiber. A control unit controls a wavelength change operation according to the control signal. The control unit according to a wavelength change command, commands the optical power adjustment unit to block output of the optical signal, commands the light signal output unit to change the wavelength of the optical signal after the optical signal is blocked,
(Continued)

and commands the light signal output unit and the optical power adjustment unit to output the optical signal after the wavelength change operation.

24 Claims, 10 Drawing Sheets

Related U.S. Application Data continuation of application No. 16/162,982, filed on Oct. 17, 2018, now Pat. No. 10,630,415, which is a continuation of application No. 15/553,367, filed as application No. PCT/JP2016/000494 on Feb. 1, 2016, now Pat. No. 10,135,558.

(51) Int. Cl.
 *G02B 6/42* (2006.01)
 *H04B 10/40* (2013.01)
 *G02B 6/293* (2006.01)

(52) U.S. Cl.
 CPC .......... *H04B 10/572* (2013.01); *H04J 14/022* (2013.01); *G02B 6/29395* (2013.01)

(58) Field of Classification Search
 USPC .......................................................... 398/95
 See application file for complete search history.

(56) References Cited

U.S. PATENT DOCUMENTS

| | | |
|---|---|---|
| 2005/0146782 A1 | 7/2005 | Takeyama et al. |
| 2006/0045520 A1 | 3/2006 | Nakano et al. |
| 2006/0088322 A1 | 4/2006 | Kobayashi et al. |
| 2009/0162051 A1 | 6/2009 | Hudgins et al. |
| 2009/0208225 A1 | 8/2009 | Daghighian et al. |
| 2010/0202781 A1 | 8/2010 | Hudgins |
| 2010/0239263 A1 | 9/2010 | Tokura et al. |
| 2011/0170880 A1 | 7/2011 | Daghighian et al. |
| 2012/0063777 A1* | 3/2012 | Tanaka ............... H04Q 11/0067 398/47 |

FOREIGN PATENT DOCUMENTS

| | | |
|---|---|---|
| CN | 104320184 A | 1/2015 |
| JP | H08-279802 A | 10/1996 |
| JP | 2001-268015 A | 9/2001 |
| JP | 2004-062105 A | 2/2004 |
| JP | 2006-121368 A | 5/2006 |
| JP | 2007-158057 A | 6/2007 |
| JP | 2007-165470 A | 6/2007 |
| JP | 2008-028569 A | 2/2008 |
| JP | 2009-081512 A | 4/2009 |
| JP | 2010-283644 A | 12/2010 |
| JP | 2011-151210 A | 8/2011 |
| JP | 2014-236420 A | 12/2014 |
| JP | 2014-240889 A | 12/2014 |
| WO | WO-01/03349 A1 | 1/2001 |
| WO | WO-2012/113447 A1 | 8/2012 |

OTHER PUBLICATIONS

International Search Report corresponding to PCT/JP2016/000494, 2 pages, dated Mar. 29, 2016.
Japanese Office Action issued by the Japan Patent Office for Japanese Application No. 2017-503332 dated Jul. 3, 2018 (6 pages).
Chinese Notification of First Office Action issued in Chinese Patent Application No. 201680013874.8, dated Apr. 3, 2019, 16 pages.
Japanese Notice of Reasons for Refusal issued in Japanese Patent Application No. 2017-503332, dated Dec. 10, 2019, 8 pages.
China Notificatin to Grant Patent Right for Invention issued in Chinese Patent Application No. 201680013874.8, dated Nov. 9, 2020, 7 pages.
Lin Daheng et al. "Wavelength control of DBR wavelength tunable optical module" Electronic Test, China Academic Journal Electronic Publishing House, http://www.cnki.net, Mar. 31, 2014, pp. 1-3.
Japanese Office Action for JP Application No. 2020-115720 dated Jun. 22, 2021 with English Translation.
Shogo Yamanaka et al., "100 GB/s CFP coherent transceiver enabled by power-optimized DSP", OECC/ACOFT 2014 PDP Papers, 2014.
JP Office Action for JP Application No. 2022-053260, dated Mar. 22, 2023 with English Translation.

* cited by examiner

WAVELENGTH-TUNABLE PLUGGABLE OPTICAL MODULE, OPTICAL COMMUNICATION SYSTEM AND WAVELENGTH CHANGE METHOD OF WAVELENGTH-TUNABLE PLUGGABLE OPTICAL MODULE

CROSS-REFERENCE TO RELATED APPLICATIONS

The present application is a continuation application of U.S. patent application Ser. No. 16/815,774, filed Mar. 11, 2020, which is a continuation application of U.S. patent application Ser. No. 16/162,982, filed Oct. 17, 2018, which is a continuation of U.S. patent application Ser. No. 15/553,367, filed Aug. 24, 2017, which is a national stage application of International Application No. PCT/JP2016/00494 entitled "WAVELENGTH-TUNABLE PLUGGABLE OPTICAL MODULE. OPTICAL COMMUNICATION SYSTEM AND WAVELENGTH CHANGE METHOD OF WAVELENGTH-TUNABLE PLUGGABLE OPTICAL MODULE," filed on Feb. 1, 2016, which claims the benefit of priority from Japanese Application No. JP 2015-043203, filed Mar. 5, 2015, the disclosures of which are incorporated herein in their entirety.

TECHNICAL FIELD

The present invention relates to a wavelength-tunable pluggable optical module, an optical communication system and a wavelength change method of a wavelength-tunable pluggable optical module.

BACKGROUND ART

In an optical communication system, an optical module used for transmitting and receiving an optical signal is embedded. For example, a wavelength-tunable optical transmission device used in a backup system of a WDM (Wavelength Division Multiplex) network has been proposed (Patent Literature 1). In the wavelength-tunable optical transmission device, when a wavelength is changed, a controller changes a state of an optical gate from blocking to passing after the wavelength reaches a target value and becomes stable. In addition to this, a device with a built-in wavelength-tunable light source that blocks an optical output during wavelength change (Patent Literature 2), an integrated laser device (Patent Literature 3), and a wavelength-tunable optical output device (Patent Literature 4) have been proposed.

Meanwhile, for example, in the optical communication system in conformity with standards such as SFP (Small Form-Factor Pluggable) and XFP, use of the wavelength-tunable pluggable optical module has been developed. The wavelength-tunable pluggable optical module is an optical transceiver that is insertable into and removable from a socket of the optical communication device. When performing a control of the wavelength-tunable pluggable optical module, the wavelength-tunable pluggable optical module receives control information from the optical communication apparatus serving as a host side. Then, operation switching and changing of the wavelength-tunable pluggable optical module are performed according to the received control information.

In the wavelength-tunable pluggable optical module, there may be a case where the wavelength change is requested by the optical communication device. When complying with a request for the wavelength change, the wavelength-tunable pluggable optical module needs to autonomously perform and complete the change operation.

CITATION LIST

Patent Literature

[Patent Literature 1] Japanese Unexamined Patent Application Publication No. 2001-268015
[Patent Literature 2] Japanese Unexamined Patent Application Publication No. 2004-62105
[Patent Literature 3] Japanese Unexamined Patent Application Publication No. 2007-158057
[Patent Literature 4] Japanese Unexamined Patent Application Publication No. 2008-28569

SUMMARY OF INVENTION

Technical Problem

However, the inventor has found problems described below in the above-mentioned method. When the wavelength change is performed in the wavelength-tunable pluggable optical module, an unstable optical signal and incorrect wavelength optical signal may be transmitted to an optical transmission line due to a gap between timings of change or instability of a state of a light source. If the unstable optical signal and incorrect wavelength optical signal are transmitted, the malfunction of the communication or the deterioration of the communication quality may occur.

Further, in contrast to configurations described in Patent Literatures 1 to 4, the wavelength-tunable pluggable optical module has to perform the wavelength change according to a control from an external device serving as a communication host of a system in which the wavelength-tunable pluggable optical module is embedded. Therefore, the wavelength-tunable pluggable optical module has a particular problem where the wavelength-tunable pluggable optical module has to perform the wavelength change of the optical signal while preventing the unstable optical signal and incorrect wavelength optical signal from being transmitted according to the request from the external device.

The present invention has been made in view of the aforementioned circumstances and aims to prevent transmission of an optical signal to an optical transmission line before a wavelength change operation is completed when a wavelength-tunable pluggable optical module is requested for wavelength change from outside.

Solution to Problem

An aspect of the present invention is a wavelength-tunable pluggable optical module including: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of an optical signal that corresponds to the communication data signal; an optical power adjustment unit configured to be capable of adjusting optical power of the optical signal; a pluggable optical receptor configured to be capable of outputting the optical signal output from the optical power adjustment unit to an optical fiber, the optical fiber being insertable into and removable from the pluggable optical receptor; a control unit configured to control a wavelength change operation according to the control signal from the pluggable electric connector, in which the control unit, according to a wavelength change command included in the control signal, commands the optical power adjustment unit to block output of the optical signal, commands the optical signal output unit to change the wavelength of the optical signal after blocking the optical signal, and commands the optical power adjustment unit to output the optical signal after the wavelength change operation.

An aspect of the present invention is a wavelength-tunable pluggable optical module including: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of a first optical signal that corresponds to the communication data signal; an optical power adjustment unit configured to be capable of adjusting optical power of the first optical signal; a first pluggable optical receptor configured to be capable of outputting the first optical signal output from the optical power adjustment unit to a first optical fiber, the first optical fiber being insertable into and removable from the first pluggable optical receptor; a control unit configured to control a wavelength change operation according to the control signal from the pluggable electric connector, a second pluggable optical receptor to which a second optical signal can be input from a second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, in which the control unit, according to a wavelength change command included in the control signal, commands the optical power adjustment unit to block output of the first optical signal, commands the optical signal output unit to change the wavelength of the first optical signal after blocking the first optical signal, and commands the optical power adjustment unit to output the first optical signal after the wavelength change operation, and the optical reception unit outputs an electric signal corresponding to the received second optical signal to the optical transmission device via the pluggable electric connector.

An optical communication system including: an optical fiber configured to transmit an optical signal; a wavelength-tunable pluggable optical module configured to output the optical signal to the optical fiber, the optical fiber being insertable into and removable from the wavelength-tunable pluggable optical module; and an optical transmission device configured to control the wavelength-tunable pluggable optical module, the wavelength-tunable pluggable optical module being insertable into and removable from the optical transmission device, in which the wavelength-tunable pluggable optical module includes: a pluggable electric connector configured to be capable of communicating a communication data signal and a control signal with the optical transmission device, the pluggable electric connector being insertable into and removable from the optical transmission device; an optical signal output unit configured to be capable of selectively outputting a wavelength of the optical signal that corresponds to the communication data signal; an optical power adjustment unit configured to be capable of adjusting optical power of the optical signal; a pluggable optical receptor configured to be capable of outputting the optical signal output from the optical power adjustment unit to the optical fiber, the optical fiber being insertable into and removable from the pluggable optical receptor; and a control unit configured to control a wavelength change operation according to the control signal from the pluggable electric connector, wherein the control unit, according to a wavelength change command included in the control signal, commands the optical power adjustment unit to block output of the optical signal, commands the optical signal output unit to change the wavelength of the optical signal after blocking the optical signal, and commands the optical power adjustment unit to output the optical signal after the wavelength change operation.

An aspect of the present invention is an optical communication system including: a first optical fiber and a second optical fiber configured to transmit an optical signal; a wavelength-tunable pluggable optical module configured to output a first optical signal to the first optical fiber, a second optical signal being input to the wavelength-tunable pluggable optical module from the second optical fiber, the first optical fiber and the second optical fiber being insertable into and removable from the wavelength-tunable pluggable optical module; and an optical transmission device configured to control the wavelength-tunable pluggable optical module, the wavelength-tunable pluggable optical module being capable of insertable into and removable from the optical transmission device, in which the wavelength-tunable pluggable optical module includes: a pluggable electric connector configured to be capable of communicating a communication data signal and a control signal with the optical transmission device, the pluggable electric connector being insertable into and removable from the optical transmission device; an optical signal output unit configured to be capable of selectively outputting a wavelength of the first optical signal that corresponds to the communication data signal; an optical power adjustment unit configured to be capable of adjusting optical power of the first optical signal; a first pluggable optical receptor configured to be capable of outputting the first optical signal output from the optical power adjustment unit to the first optical fiber, the first optical fiber being insertable into and removable from the pluggable optical receptor, a control unit configured to control a wavelength change operation according to the control signal from the pluggable electric connector, a second pluggable optical receptor to which a second optical signal can be input from a second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, wherein the control unit, according to a wavelength change command included in the control signal, commands the optical power adjustment unit to block output of the first optical signal, commands the optical signal output unit to change the wavelength of the first optical signal after blocking the first optical signal, and commands the optical power adjustment unit to output the first optical signal after the wavelength change operation, and the optical reception unit outputs an electric signal corresponding to the received second optical signal to the optical transmission device via the pluggable electric connector.

An aspect of the present invention is a wavelength change method of a wavelength-tunable pluggable optical module including: in the wavelength-tunable pluggable optical module that includes: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of an optical signal that corresponds to the communication data signal; an optical power adjustment unit configured to be capable of adjusting optical power of the optical signal; and a pluggable optical receptor configured to be capable of outputting the optical signal output from the optical power adjustment unit to an optical fiber, the optical fiber being insertable into and removable from the pluggable optical receptor; according to a wavelength change command included in the control signal received via the pluggable electric connector, commanding the optical power adjustment unit to block output of the optical signal, commanding the optical signal output unit to change the wavelength of the optical signal after blocking the optical signal, and commanding the optical power adjustment unit to output the optical signal after the wavelength change operation.

An aspect of the present invention is a wavelength change method of a wavelength-tunable pluggable optical module including: in a wavelength-tunable pluggable optical module that includes: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of a first optical signal that corresponds to the communication data signal; an optical power adjustment unit configured to be capable of adjusting optical power of the first optical signal, and a first pluggable optical receptor configured to be capable of outputting the first optical signal output from the optical power adjustment unit to a first optical fiber, the first optical fiber being insertable into and removable from the first pluggable optical receptor; a second pluggable optical receptor to which a second optical signal can be input from a second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, causing the optical reception unit to output an electric signal corresponding to the received second optical signal to the optical transmission device via the pluggable electric connector, according to a wavelength change command included in the control signal received via the pluggable electric connector, commanding the optical power adjustment unit to block output of the first optical signal, commanding the optical signal output unit to change the wavelength of the first optical signal after blocking the first optical signal, and commanding the optical power adjustment unit to output the first optical signal after the wavelength change operation.

Advantageous Effects of Invention

According to the present invention, it is possible to prevent transmission of an optical signal to an optical transmission line before a wavelength change operation is completed when a wavelength-tunable pluggable optical module is requested for wavelength change from outside.

DESCRIPTION OF EMBODIMENTS

Figure 1:
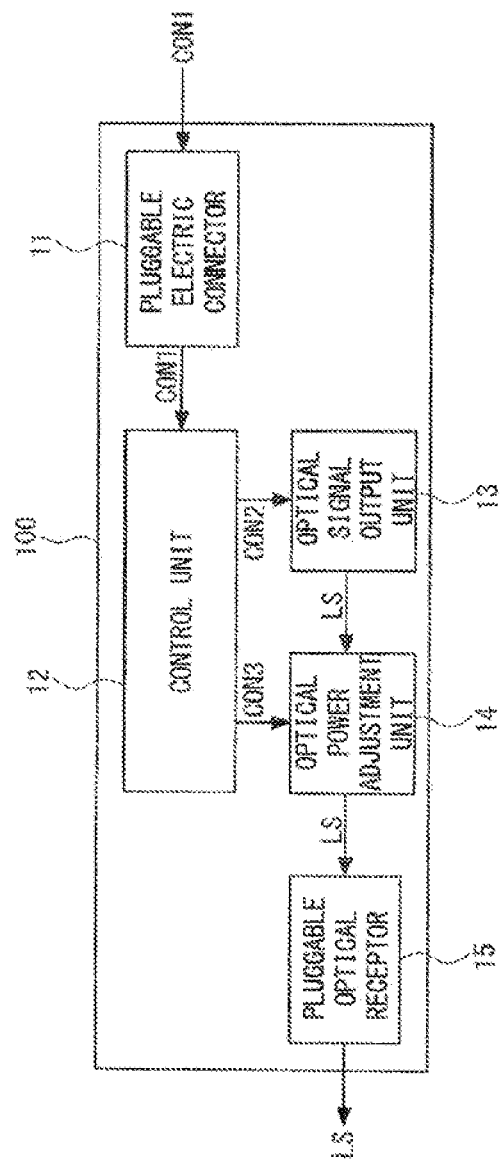
FIG. 1 is a block diagram schematically illustrating a configuration of a wavelength-tunable pluggable optical module according to a first exemplary embodiment.

Exemplary embodiments of the present invention will be described below with reference to the drawings. The same components are denoted by the same reference numerals throughout the drawings, and a repeated explanation is omitted as needed.

First Exemplary Embodiment

Figure 2:
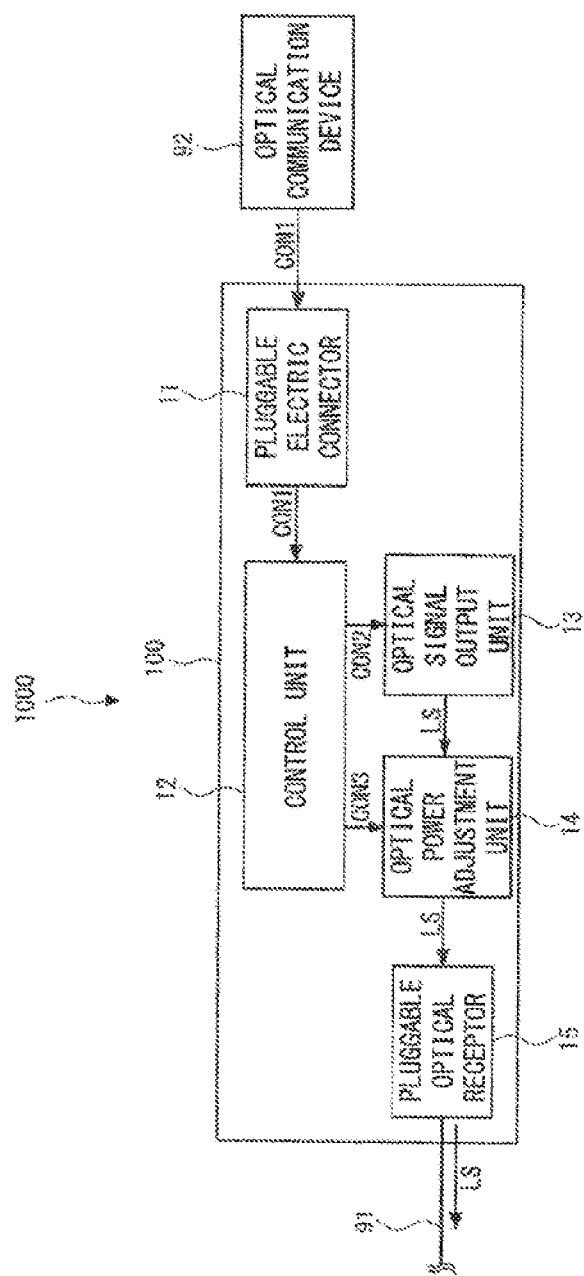
FIG. 2 is a block diagram illustrating a configuration example of a main part of an optical communication system in which the wavelength-tunable pluggable optical module according to the first exemplary embodiment is embedded.

A wavelength-tunable pluggable optical module 100 according to a first exemplary embodiment will be described. FIG. 1 is a block diagram schematically illustrating a configuration of the wavelength-tunable pluggable optical module 100 according to the first exemplary embodiment. FIG. 2 is a block diagram illustrating a configuration example of a main part of an optical communication system 1000 in which the wavelength-tunable pluggable optical module 100 according to the first exemplary embodiment is embedded. As illustrated in FIG. 2, the wavelength-tunable pluggable optical module 100 is configured to cause an optical fiber with connector 91 to be insertable into and removable from the wavelength-tunable pluggable optical module 100. For example, a FC type connector or MU type connector can be used for the connector of the optical fiber with connector 91. The wavelength-tunable pluggable optical module 100 is controlled based on a control signal CON1 input from an optical communication device 92 serving as a communication host. Note that the wavelength-tunable pluggable optical module 100 may also receive a data signal with the control signal CON1 from the optical communication device 92. In this case, the wavelength-tunable pluggable optical module 100 may output an optical signal LS modulated based on the received data signal. The optical communication device 92 performs communication data processing such as flaming processing of a communication data signal from the wavelength-tunable pluggable optical module 100 or a communication data signal input to the wavelength-tunable pluggable optical module 100.

The wavelength-tunable pluggable optical module 100 includes a pluggable electric connector 11, an optical signal output unit 13, an optical power adjustment unit 14, a control unit 12, and a pluggable optical receptor 15.

The pluggable electric connector 11 is configured to be insertable into and removable from the optical communication device 92. The pluggable electric connector 11 receives the control signal CON1 that is an electric signal output from the optical communication device 92 and forwards the control signal CON1 to the control unit 12. The pluggable electric connector 11 may also forward an electric signal output from the control unit 12 to the optical communication device 92.

The control unit 12 controls operations of the optical signal output unit 13 and the optical power adjustment unit 14 based on the control signal CON1 input from the optical communication device 92 via the pluggable electric connector 11. Specifically, the control unit 12 can change a wavelength of the optical signal LS (also referred to as a first optical signal) output from the optical signal output unit 13 by a control signal CON2 output to the optical signal output unit 13. Further, a modulation signal is included in the control signal CON2 and the optical signal output unit 13 modulates the optical signal LS according to the modulation signal. The control unit 12 may also adjust optical power of the optical signal LS output from the optical power adjustment unit 14 by a control signal CON 3 output to the optical power adjustment unit 14.

The optical signal output unit 13 outputs the optical signal LS of a predetermined wavelength modulated by a predetermined modulation method. The wavelength of the optical signal LS output from the optical signal output unit 13 is tunable. Thus, the optical signal output unit 13 outputs the optical signal LS of a single wavelength within a tunable wavelength range according to the control signal CON2 output from the control unit 12. The optical signal output unit 13 may modulate the optical signal LS by various types of modulation methods such as phase modulation, amplitude modulation and polarization modulation or by combining the various types of modulation methods.

Figure 3:
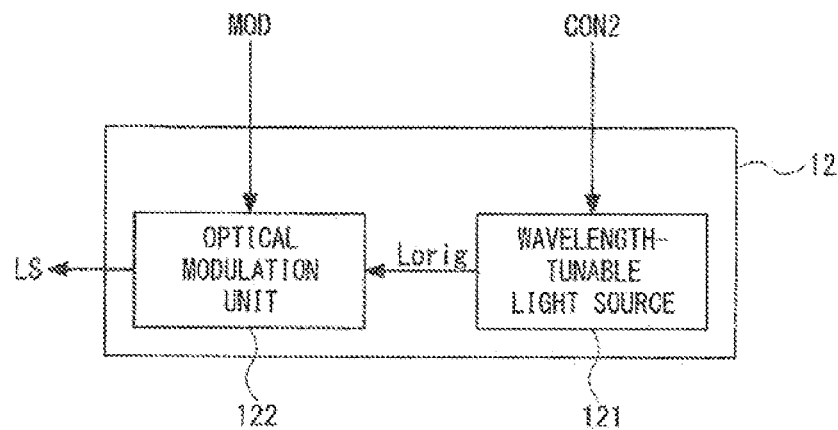
FIG. 3 is a block diagram illustrating a configuration example of an optical signal output unit according to the first exemplary embodiment.

A configuration example of the optical signal output unit 13 will be described. FIG. 3 is a block diagram illustrating the configuration example of the optical signal output unit 13 according to the first exemplary embodiment. The optical signal output unit 13 includes a wavelength-tunable light source 121 and an optical modulation unit 122. The wavelength-tunable light source 121 includes a semiconductor laser and wavelength tuning means such as a ring oscillator, for example, and outputs an output light Lorig. The output light Lorig is controlled by the control signal CON2. The optical modulation unit 122 is a Mach-Zehnder type optical modulator, for example. Note that, although not illustrated in FIGS. 1 and 2, the optical modulation unit 122 outputs the optical signal LS generated by modulating the output light Lorig according to the modulation signal MOD corresponding to the communication data signal input from the optical communication device 92 via the pluggable electric connector 11. For example, the modulation signal MOD is output from a drive circuit which is not illustrated according to the communication data signal input from the optical communication device 92.

The optical power adjustment unit 14 can adjust the optical power of the optical signal LS by attenuating or blocking the optical signal LS output from the optical signal output unit 13. As described above, the optical power adjustment unit 14 adjusts the optical power of the optical signal LS according to the control signal CON3 output from the control unit 12. For example, an optical attenuator may be used as the optical power adjustment unit 14.

The pluggable optical receptor 15 (also referred to as a first pluggable optical receptor) is configured to cause the connector of the outside optical fiber with connector 91 (also referred to as a first optical transmission line) to be insertable into and removable from the pluggable optical receptor 15. The pluggable optical receptor 15 transmits the optical signal LS output from the optical power adjustment unit 14 to the optical fiber 91.

Figure 4:
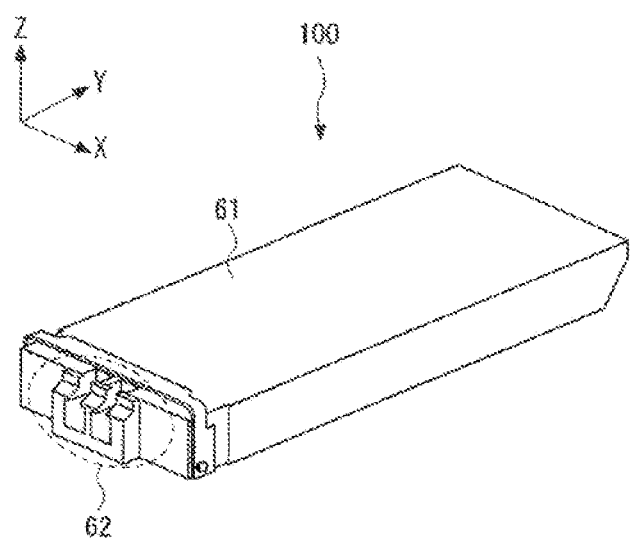
FIG. 4 is a perspective view when the wavelength-tunable pluggable optical module according to the first exemplary embodiment is observed from a side of an optical fiber.
Figure 5:
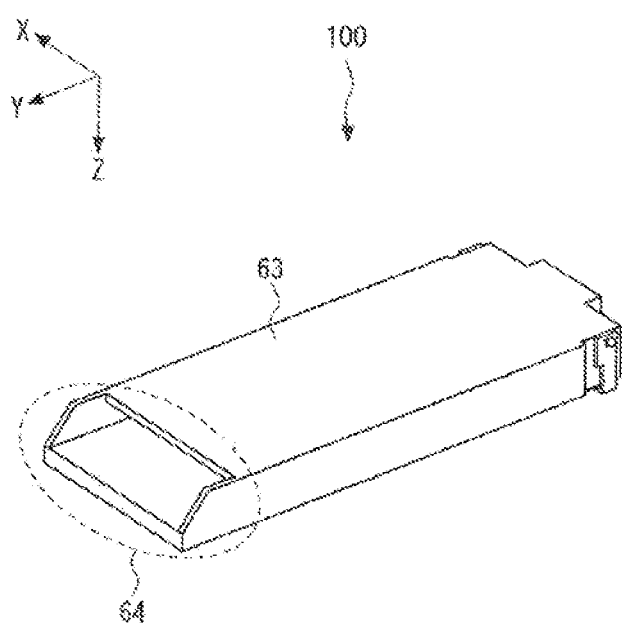
FIG. 5 is a perspective view when the wavelength-tunable pluggable optical module according to the first exemplary embodiment is observed from a side of an optical communication device.

Appearances of the wavelength-tunable pluggable optical module 100 will be described. FIG. 4 is a perspective view when the wavelength-tunable pluggable optical module 100 according to the first exemplary embodiment is observed from a side of the optical fiber 91. A numerical sign 61 shown in FIG. 4 indicates an upper surface of the wavelength-tunable pluggable optical module 100. A numerical sign 62 shown in FIG. 4 indicates an entry point of the pluggable optical receptor 15 into which the connector of the optical fiber 91 is inserted. FIG. 5 is a perspective view when the wavelength-tunable pluggable optical module 100 according to the first exemplary embodiment is observed from a side of the optical communication device 92. A numerical sign 63 shown in FIG. 5 indicates a lower surface of the wavelength-tunable pluggable optical module 100. A numerical sign 64 shown in FIG. 5 indicates a connection part of the pluggable electric connector 11 which is connected to the optical communication device 92.

Figure 6:
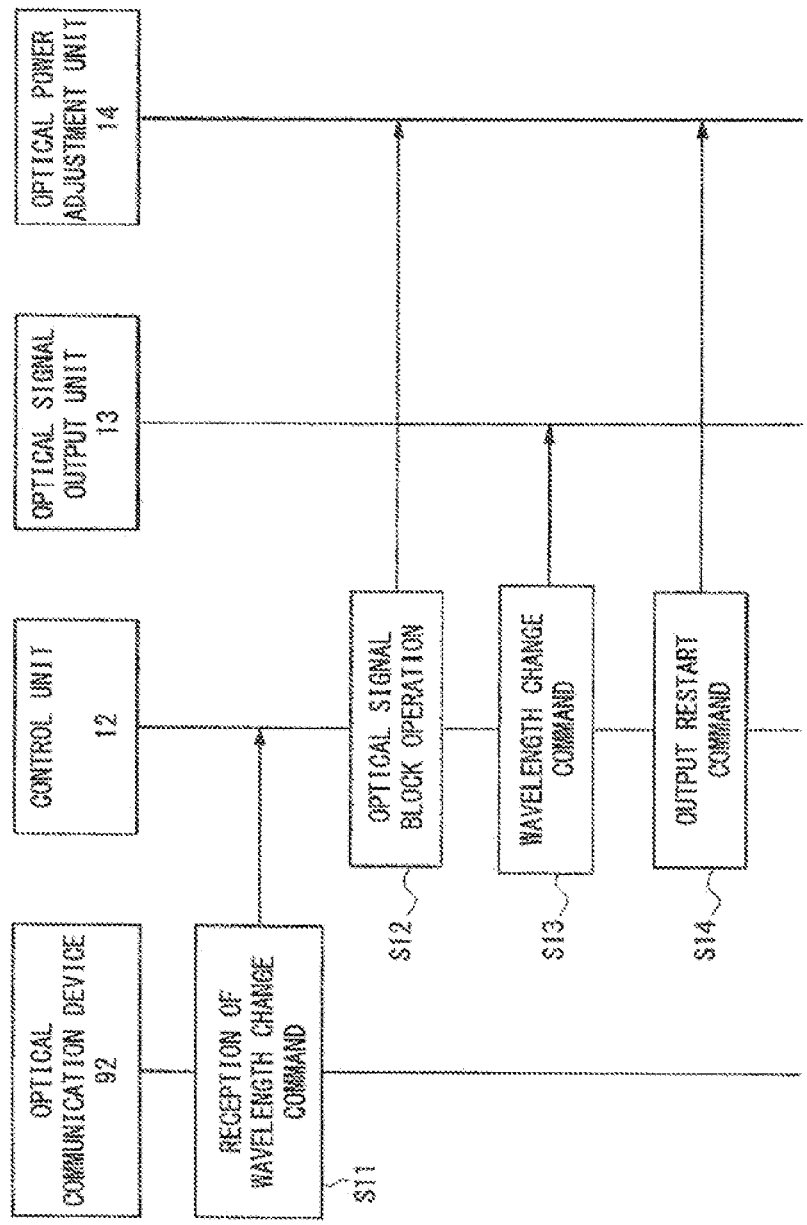
FIG. 6 is a sequence diagram illustrating a wavelength change operation of the wavelength-tunable pluggable optical module according to the first exemplary embodiment.

Next, a wavelength change operation of the wavelength-tunable pluggable optical module 100 will be described. FIG. 6 is a sequence diagram illustrating the wavelength change operation of the wavelength-tunable pluggable optical module 100 according to the first exemplary embodiment.

Step S11: Reception of Wavelength Change Command

In a state where the wavelength-tunable pluggable optical module 100 outputs the optical signal LS of the wavelength ∥1 to the optical fiber 91, the control unit 12 receives the control signal CON1 including a wavelength change command for the optical signal from the optical communication device 92.

Step S12: Optical Signal Block Operation

The control unit 12 performs a block operation of the optical signal based on the wavelength change command. Specifically, the control unit 12 commands the optical power adjustment unit 14 to block the optical signal LS using the control signal CON3. The optical power adjustment unit 14 blocks the optical signal LS according to the control signal CON3. The control unit 12 may also perform the block operation of the optical signal LS by commanding the optical signal output unit 13 to stop outputting the optical signal LS using the control signal CON2. Note that the control unit 12 may also command the optical power adjustment unit 14 to block the optical signal LS and command the optical signal output unit 13 to stop outputting the optical signal LS in parallel when performing the block operation of the optical signal.

Step S13: Wavelength Change Command

The control unit 12 commands the optical signal output unit 13 to change the wavelength of the optical signal LS from ∥1 to ∥2 (∥1*∥2) based on the wavelength change command. Thus, the optical signal output unit 13 changes the wavelength of the optical signal LS from ∥1 to ∥2. In this case, the optical signal output unit 13 may perform the operation for changing the wavelength from ∥1 to ∥2 after stopping the output of the optical signal LS.

Step S14: Output Restart Command

After the wavelength change is finished, the control unit 12 performs an operation for restarting the output of the optical signal LS. Specifically, the control unit 12 controls the optical power adjustment unit 14 to adjust the optical signal LS to a predetermined optical power. Thus, the optical signal LS of the wavelength ∥2 is output to the optical fiber 91.

The control unit 12 may control the optical signal output unit 13 to output the optical signal LS of the wavelength ∥2 after the wavelength change before the control of the optical power adjustment unit 14 in the Step S14 when the output of the optical signal of the optical signal output unit 13 has been stopped in the Step S12 or S13.

As described above, the present configuration robustly blocks the output of the optical signal when the wavelength-tunable pluggable optical module changes the wavelength of the optical signal according to the command of the optical communication device 92. Therefore, transmission of an instable optical signal during the wavelength change can be prevented. Then, the optical signal is transmitted after the wavelength change so that the optical signal having a desired wavelength and stability can be transmitted.

Second Exemplary Embodiment

Figure 7:
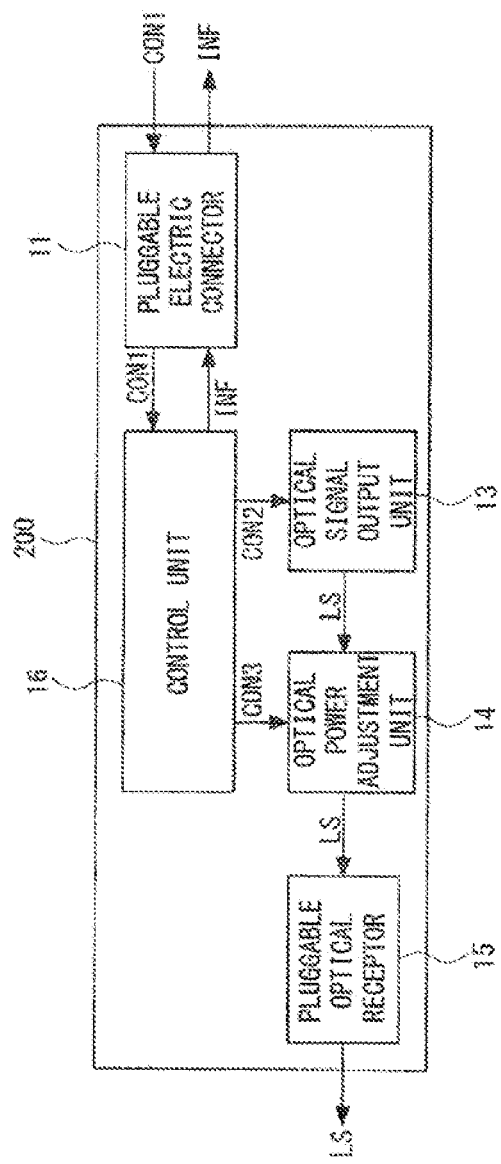
FIG. 7 is a block diagram schematically illustrating a configuration of a wavelength-tunable pluggable optical module according to a second exemplary embodiment.

A wavelength-tunable pluggable optical module 200 according to a second exemplary embodiment will be described. FIG. 7 is a block diagram schematically illustrating a configuration of the wavelength-tunable pluggable optical module 200 according to the second exemplary embodiment. The wavelength-tunable pluggable optical module 200 has a configuration where the control unit 12 of the wavelength-tunable pluggable optical module 100 according to the first exemplary embodiment is replaced with a control unit 16. Note that the wavelength-tunable pluggable optical module 200 may also receive the data signal with the control signal CON1 from the optical communication device 92. In this case, the wavelength-tunable pluggable optical module 200 may output the optical signal LS modulated based on the received data signal. Other configuration of the wavelength-tunable pluggable optical module 200 is the same as that of the wavelength-tunable pluggable optical module 100, and thereby a description thereof will be omitted.

Figure 8:
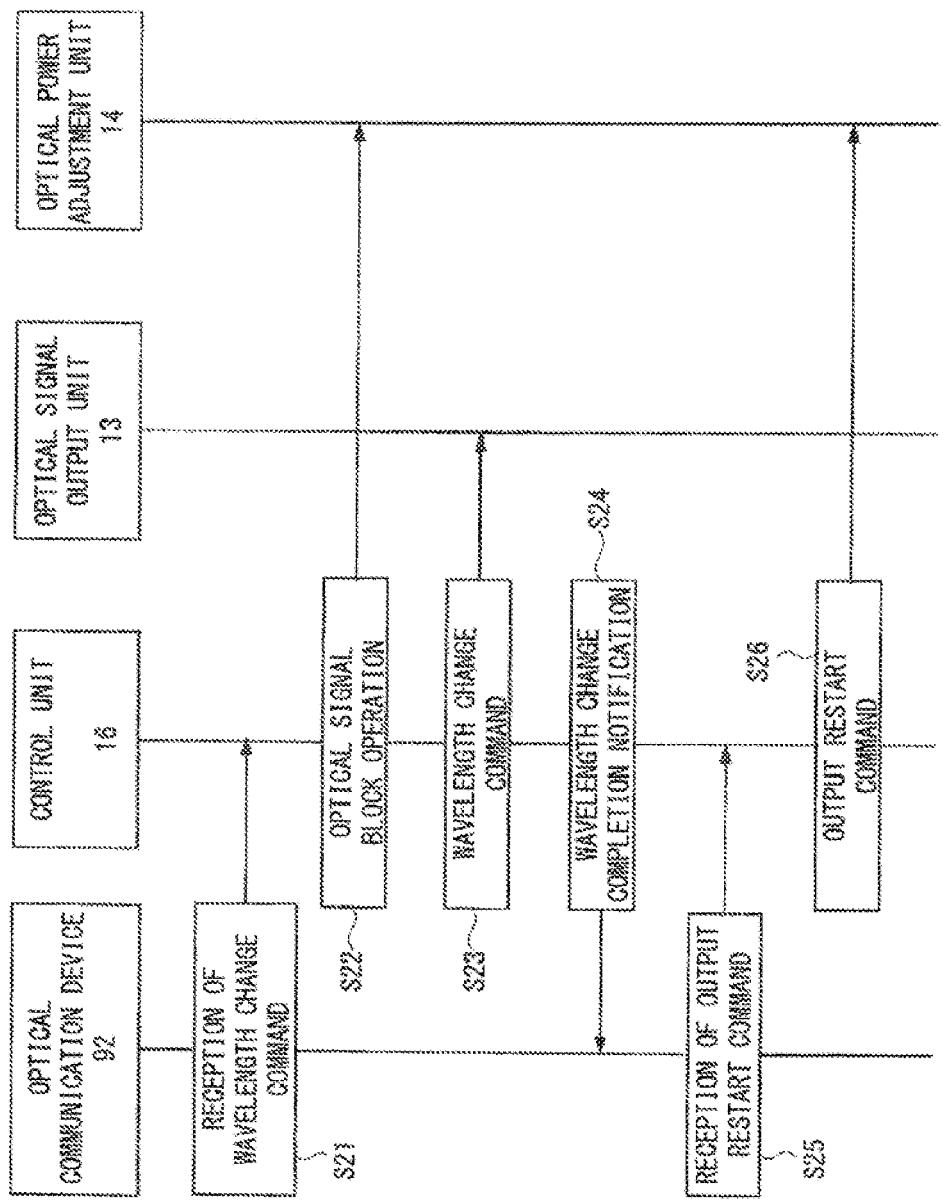
FIG. 8 is a sequence diagram illustrating a wavelength change operation of the wavelength-tunable pluggable optical module according to the second exemplary embodiment.

A wavelength change operation of the control unit 16 is different as compared with the control unit 12. Hereinafter, the wavelength change operation of the wavelength-tunable pluggable optical module 200 will be described. FIG. 8 is a sequence diagram illustrating the wavelength change operation of the wavelength-tunable pluggable optical module 200 according to the second exemplary embodiment.

Step S21: Reception of Wavelength Change Command

In a state where the wavelength-tunable pluggable optical module 200 outputs the optical signal LS of the wavelength ∥1 to the optical fiber 91, the control unit 16 receives the control signal CON1 including the wavelength change command of the optical signal LS from the optical communication device 92 as in the Step S11 illustrated in FIG. 6.

Step S22: Optical Signal Block Operation

The control unit 16 performs the block operation of the optical signal based on the wavelength change command as in the Step S12 illustrated in FIG. 6. Specifically, the control unit 16 commands the optical power adjustment unit 14 to block the optical signal LS using the control signal CON3. The optical power adjustment unit 14 blocks the optical signal LS according to the control signal CON3. The control unit 16 may also perform the block operation of the optical signal LS by commanding the optical signal output unit 13 to stop outputting the optical signal LS using the control signal CON2. Note that the control unit 16 may also command the optical power adjustment unit 14 to block the optical signal LS and command the optical signal output unit 13 to stop outputting the optical signal LS in parallel when performing the block operation of the optical signal LS.

Step S23: Wavelength Change Command

The control unit 16 commands the optical signal output unit 13 to change the wavelength of the optical signal LS from ∥1 to ∥2 (∥1'∥2) based on the wavelength change command as in the Step S13 illustrated in FIG. 6. Thus, the optical signal output unit 13 changes the wavelength of the optical signal LS from ∥1 to ∥2. In this case, it is assumed that the optical signal output unit 13 performs the operation for changing the wavelength from ∥1 to ∥2 after stopping the output of the optical signal LS.

After the wavelength change is completed, the control unit 16 may also set parameters which are used for modulating the optical signal LS of the wavelength ∥2 to the optical modulation unit (the optical modulation unit 122 in FIG. 3) disposed in the optical signal output unit 13. The control unit 16 may perform the parameter setting based on the control signal CON1 or autonomously perform it regardless of a signal from outside.

Step S24: Wavelength Change Completion Notification

The control unit 16 notifies the optical communication device 92 of completion of the wavelength change operation. Here, the control unit 16 outputs a notification signal INF including information for notifying of the completion of the wavelength change operation to the optical communication device 92 via the pluggable electric connector 11.

Step S25: Reception of Output Restart Command

The optical communication device 92 receives the notification signal INF including the information for notifying of the completion of the wavelength change operation, and commands the control unit 16 to perform an output operation of the optical signal by the control signal CON1. In this case, the optical communication device 92 may also monitor a stable state of a device receiving the optical signal LS output from the wavelength-tunable pluggable optical module 200, and command to perform the output operation of the optical signal when the reception of the optical signal LS can be done.

Step S26: Output Restart Command

The control unit 16 performs an operation for restart outputting the optical signal LS according to the command for performing the output operation of the optical signal from the optical communication device 92. Specifically, the control unit 16 controls the optical power adjustment unit 14 to adjust the optical signal LS to the predetermined optical power. Thus, the optical signal LS of the wavelength ∥2 is output to the optical fiber 91.

The control unit 16 may control the optical signal output unit 13 to output the optical signal LS of the wavelength ||2 after the wavelength change before the control of the optical power adjustment unit 14 in the Step S26 when the output of the optical signal of the optical signal output unit 13 has been stopped in the Step S22 or S23.

As described above, as in the case of the wavelength-tunable pluggable optical module 100, the present configuration robustly blocks the output of the optical signal when the wavelength-tunable pluggable optical module changes the wavelength of the optical signal according to the command from the optical communication device 92. Therefore, the transmission of the instable optical signal during the wavelength change can be prevented. Then, the optical signal is transmitted after the wavelength change so that the optical signal having the desired wavelength and stability can be transmitted.

Further, according to the present configuration, the outside optical communication device 92 monitors a progress of the wavelength change and commands to restart outputting the optical signal after the wavelength change is completed. Therefore, the transmission of the instable optical signal during the wavelength change can be more robustly prevented. Furthermore, as described above, the optical communication device 92 may monitor the stable state of the device receiving the optical signal LS output from the wavelength-tunable pluggable optical module 200, and command to perform the output operation of the optical signal when the reception of the optical signal LS can be done. In other word, since it is possible to command to restart outputting the optical signal according to a timing request of a system in which the wavelength-tunable pluggable optical module 200 is embedded, it is possible to change the wavelength of the optical signal according to the operation situation of the entire system.

Third Exemplary Embodiment

Figure 9:
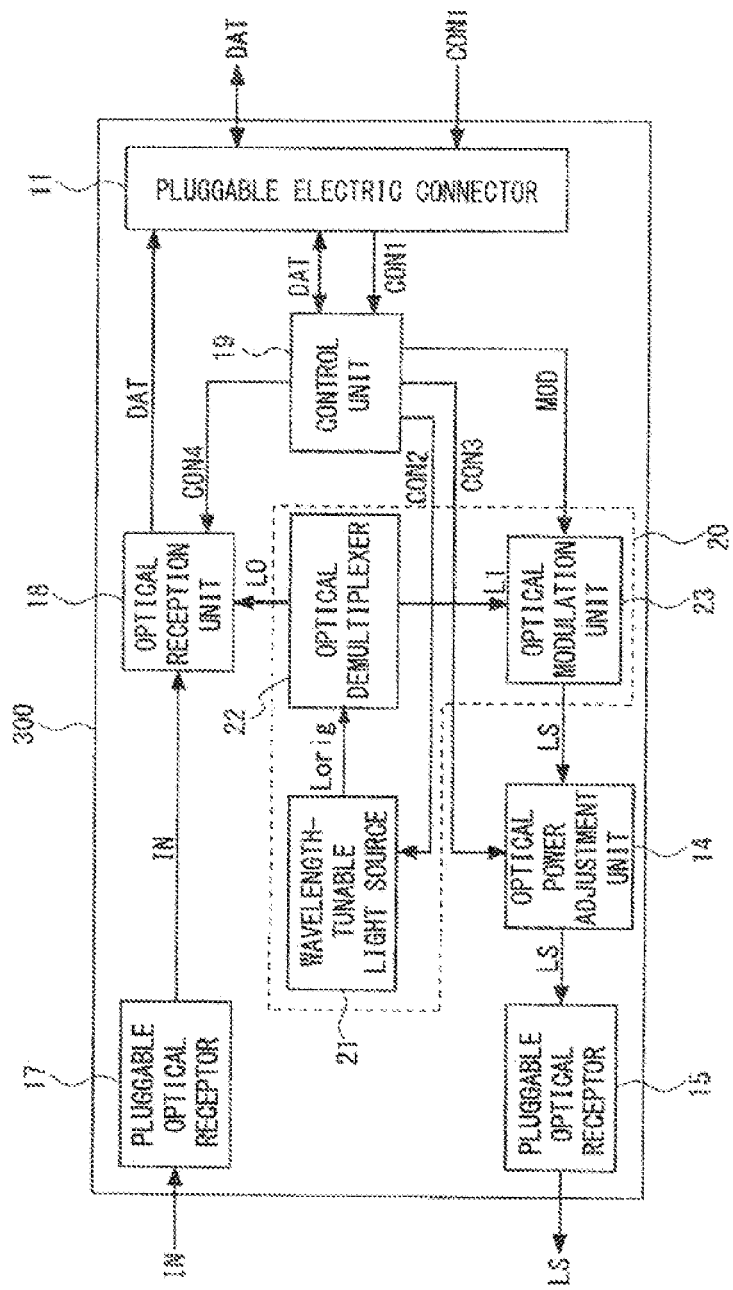
FIG. 9 is a block diagram schematically illustrating a configuration of a wavelength-tunable pluggable optical module according to a third exemplary embodiment.

A wavelength-tunable pluggable optical module 300 according to a third exemplary embodiment will be described. FIG. 9 is a block diagram schematically illustrating a configuration of the wavelength-tunable pluggable optical module 300 according to the third exemplary embodiment. The wavelength-tunable pluggable optical module 300 has a configuration where a pluggable optical receptor 17 and an optical reception unit 18 are added to the wavelength-tunable pluggable optical module 100 according to the first exemplary embodiment and the optical signal output unit 13 and the control unit 12 of the wavelength-tunable pluggable optical module 100 are replaced with an optical signal output unit 20 and a control unit 19. In the wavelength-tunable pluggable optical module 300, the optical signal output unit 20, the optical power adjustment unit 14 and the pluggable optical receptor 15 constitute a transmission side, and the pluggable optical receptor 17 and the optical reception unit 18 constitute a reception side. Note that the wavelength-tunable pluggable optical module 300 may also receive the data signal (e.g. a data signal DAT illustrated in FIG. 9) with the control signal CON1 from the optical communication device 92. In this case, the wavelength-tunable pluggable optical module 300 may output the optical signal LS modulated based on the received data signal. Other configuration of the wavelength-tunable pluggable optical module 300 is the same as that of the wavelength-tunable pluggable optical module 100, and thereby a description thereof will be omitted.

The optical signal output unit 20 includes a wavelength-tunable light source 21, an optical demultiplexer 22 and an optical modulation unit 23. The wavelength-tunable light source 21 can output lights of plural wavelengths and selectively output a light of a predetermined wavelength. The light Lorig output from the wavelength-tunable light source 21 is branched by the optical demultiplexer 22, and it is thus possible to output lights to both of a the transmission side (a light L1) and the reception side (a local oscillation light LO). The wavelength-tunable light source 21 can be configured to include such as ITLA (Integrable Tunable Laser Assembly) on which a light source device such as a semiconductor laser, a wavelength-tunable device such as a ring oscillator and a peripheral electric circuit such as a drive circuit are integrated, for example. The optical modulation unit 23 modulates (phase modulation/amplitude modulation) the light L1 from the optical demultiplexer 22 to generate the optical signal LS. For example, the optical modulation unit 23 includes such as a Mach-Zehnder type modulator. The modulation of the optical signal LS is performed according to the modulation signal MOD output from the control unit 19 via the pluggable electric connector 11 based on the control signal CON1. Note that the branching of the light Lorig is not limited to the branching by the optical demultiplexer 22, and other optical branching means can be used as appropriate.

The pluggable optical receptor 17 (also referred to as a second pluggable optical receptor) is a pluggable optical receptor of the reception side and is configured to cause a connector of the optical fiber with connector 93 (also referred to as a second optical transmission line) for the reception to be insertable into and removable from the pluggable optical receptor 17. For example, a FC type connector or MU type connector can be used for the connector of the optical fiber with connector 93. An optical signal IN (also referred to as a second optical signal) is input to the pluggable optical receptor 17 from a source via the optical fiber 93.

The optical reception unit 18 is configured, for example, as a digital coherent optical receptor. The optical reception unit 18 converts the optical signal IN received from the outside via the pluggable optical receptor 17 into the data signal DAT that is an electric signal and output the data signal DAT to the optical communication device via the pluggable electric connector 11. The optical reception unit 18 is a wavelength-tunable optical receptor and is configured to be capable of updating setting parameters used for the reception by a control signal CON4 from the control unit 19.

Figure 10:
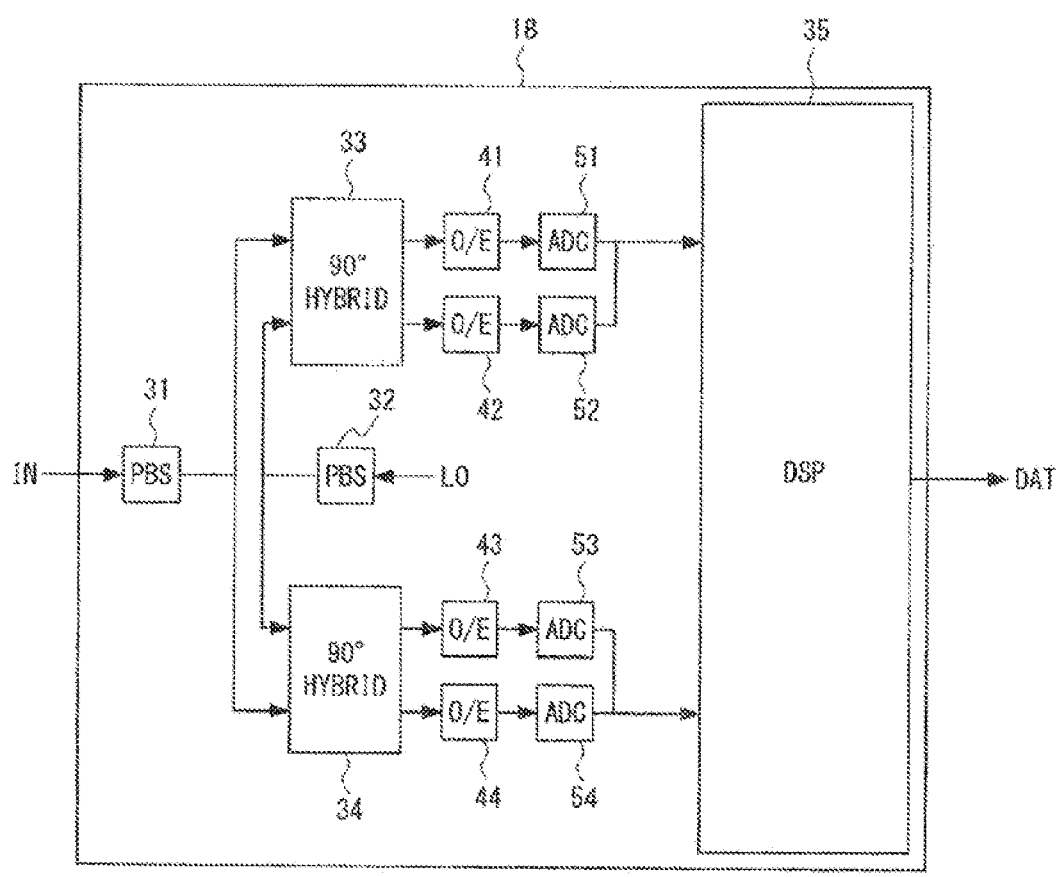
FIG. 10 is a block diagram illustrating a configuration example of an optical reception unit according to the third exemplary embodiment.

The optical reception unit 18 is an optical receptor performing a digital coherent reception in which a DP-QPSK (Dual-Polarization Quadrature Phase-Shift Keying) optical signal is demodulated into an electric signal, for example. FIG. 10 is a block diagram illustrating a configuration example of the optical reception unit 18 according to the third exemplary embodiment. As illustrated in FIG. 10, the optical reception unit 18 include a polarization beam splitter (referred to as a PBS hereinafter) 31, a PBS 32, 90-degree hybrids 33 and 34, optical/electrical converters (O/Es) 41 to 44, analog to digital converters (ADCs) 51 to 54, a digital signal processor (referred to as a DSP hereinafter) 35.

The DP-QPSK optical signal is input to the PBS 31 via the pluggable optical receptor 17. The PBS 31 splits the input DP-QPSK optical signal into two polarized components orthogonal to each other. Specifically, the PBS 31 splits the input DP-QPSK optical signal into an x-polarized component $x_{in}$ and a y-polarized component $y_{in}$ orthogonal to each other. The x-polarized component $x_{in}$ is input to the 90-degree hybrid 33 and the y-polarized component $y_{in}$ is input to the 90-degree hybrid 34.

A light from the optical demultiplexer 22 is input to the PBS 32 as the local oscillation light. In the present exemplary embodiment, the local oscillation light is a CW (Continuous Wave) light of a predetermined wavelength. The PBS 32 splits the local oscillation light into two polarized components orthogonal to each other (an x-polarized component $LO_x$ and a y-polarized component $LO_y$). The x-polarized component $LO_x$ of the local oscillation light is input to the 90-degree hybrid 33 and the y-polarized component $LO_x$ of the local oscillation light is input to the 90-degree hybrid 34.

The 90-degree hybrid 33 causes the x-polarized component $LO_x$ of the local oscillation light and the x-polarized component $x_{in}$ to interfere with each other to perform a detection, and outputs an I (In-phase) component (hereinafter referred as a $x_{in}$-I component) and Q (Quadrature) component (hereinafter referred as a xi-Q component) the phase of which is different from that of the I component by 90 degrees as detected lights. The 90 degree-hybrid 34 causes the y-polarized component $LO_y$ of the local oscillation light and the y-polarized component $y_{in}$ to interfere with each other to perform the detection, and outputs an I component (hereinafter referred as a $y_{in}$-I component) and Q component (hereinafter referred as a $y_{in}$-Q component) as detected lights.

The optical/electrical converters 41 to 44 photoelectrically convert four optical signals (the $x_{in}$-I component, the $x_{in}$-Q component, the $y_{in}$-I component and the $y_{in}$-Q component) output from the 90-degree hybrids 33 and 34, respectively. Then the optical/electrical converters 41 to 44 output the analog electric signals generated by the optical/electrical conversions to the ADCs 51 to 54. Specifically, the optical/electrical converter 41 photoelectrically converts the $x_{in}$-I component and outputs the generated analog electric signal to the ADC 51. The optical/electrical converter 42 photoelectrically converts the $x_{in}$-Q component and outputs the generated analog electric signal to the ADC 52. The optical/electrical converter 43 photoelectrically converts the $y_{in}$-I component and outputs the generated analog electric signal to the ADC 53. The optical/electrical converter 44 photoelectrically converts the $y_{in}$-Q component and outputs the generated analog electric signal to the ADC 54.

The ADCs 51 to 54 convert the analog electric signals output from the optical/electrical converters 41 to 44 into digital signals and outputs the converted digital signals to the DSP 35.

The DSP 35 performs predetermined polarization separation digital signal processing on the input digital signals and outputs the data signal DAT including demodulated signals. The data signal DAT is output to the external optical communication device 92 via the pluggable electric connector 11.

Next, a wavelength change operation of the wavelength-tunable pluggable optical module 300 will be described. As the wavelength change operation of the transmission side is the same as that of the wavelength change operation of the wavelength-tunable pluggable optical module 200 illustrated in FIG. 8, redundant descriptions of that will be omitted.

Note that, in the wavelength change operation of the transmission side of the wavelength-tunable pluggable optical module 300, after the completion of the wavelength change corresponding to the Step S23 in FIG. 8, the control unit 19 may set parameters used for modulating the optical signal of the wavelength ||2 to the optical modulation unit (the optical modulation unit 23 in FIG. 9) disposed in the optical signal output unit 20. The control unit 19 may perform the parameter setting based on the control signal CON1 or the control unit 19 may autonomously perform it regardless of a signal from outside.

Figure 11:
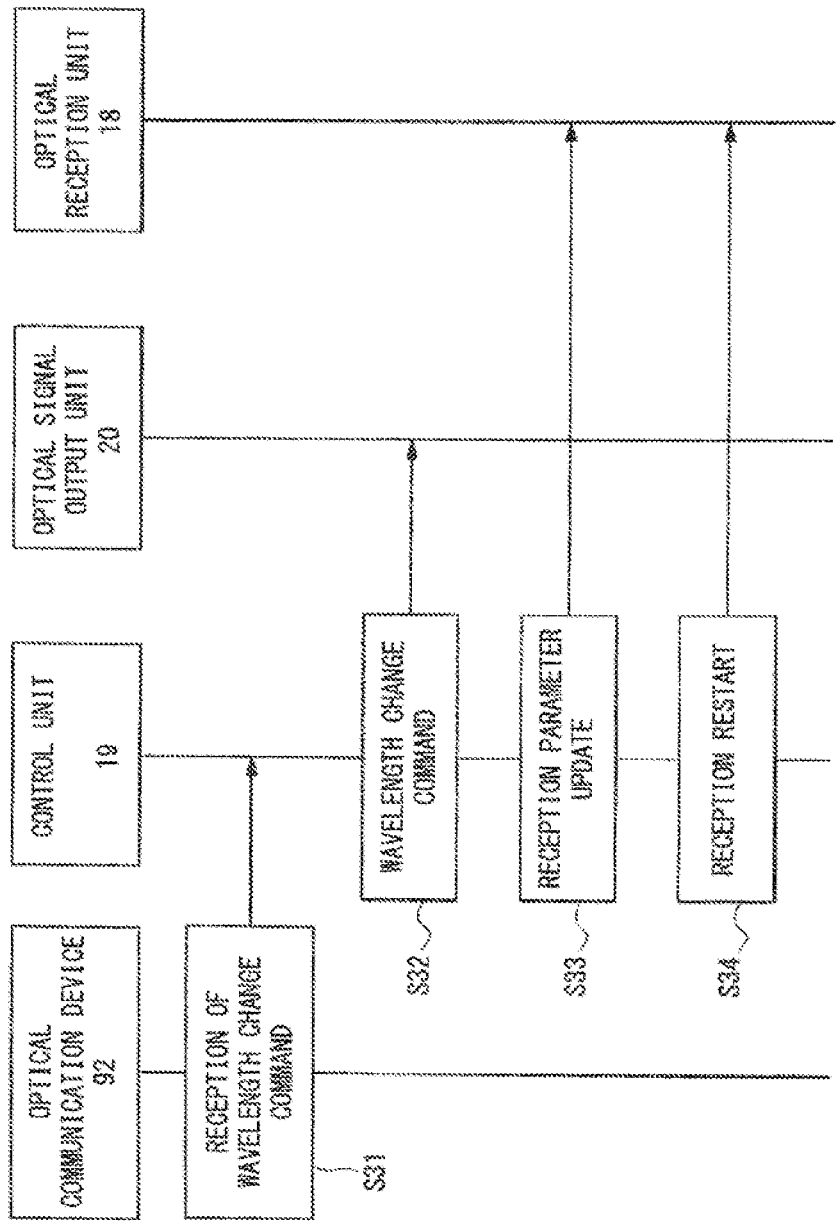
FIG. 11 is a sequence diagram illustrating a wavelength change operation of a reception side of the wavelength-tunable pluggable optical module according to the third exemplary embodiment.

The wavelength change operation of the reception side of the wavelength-tunable pluggable optical module 300 will be described. FIG. 11 is a sequence diagram illustrating of the wavelength change operation of the reception side of the wavelength-tunable pluggable optical module 300 according to the third exemplary embodiment.

Step S31: Reception of Wavelength Change Command

In a state where the optical signal IN of the wavelength ||1 is input to the wavelength-tunable pluggable optical module 300 from the optical fiber 93, the control unit 19 receives the control signal CON1 including the wavelength change command from the optical communication device 92 as in the Step S11 illustrated in FIG. 6. In this case, the optical communication device 92 may autonomously decide the wavelength change according to a communication state or may command the wavelength-tunable pluggable optical module 300 to perform the wavelength change according to a request of an external device such as a source.

Step S32: Wavelength Change Command

The control unit 19 commands the wavelength-tunable light source 21 of the optical signal output unit 20 to change the wavelength of the output light Lorig from A1 to A2 (A1*A2) based on the wavelength change command. Thus, the wavelength-tunable light source 21 changes the wavelength of the optical signal from ill to ||2. In this case, the wavelength-tunable light source 21 performs the operation for changing the wavelength of the optical signal from ||1 to ||2 after stopping the output of the optical signal. Thus, the wavelength of the local oscillation light LO output to the optical reception unit 18 is changed from Ill to ||2.

Step S33: Reception Parameter Update

The control unit 19 updates (or sets) reception parameters that the optical reception unit 18 uses for receiving the wavelength ||2 after the wavelength change according to the control signal CON4.

Step S34: Reception Restart

The control unit 19 commands the optical reception unit 18 to restart reception of the optical signal IN by the control signal CON4. In response to this, the optical reception unit 18 restarts the reception of the optical signal IN of the wavelength ||2.

As described above, according to the present configuration, as in the case of the wavelength-tunable pluggable optical module 100, the output of the optical signal is robustly blocked when the wavelength-tunable pluggable optical module changes the wavelength of the optical signal according to the command from the optical communication device 92. Therefore, the transmission of the instable optical signal during the wavelength change can be prevented. Then, the optical signal is transmitted after the wavelength change is completed so that the optical signal having the desired wavelength and stability can be transmitted.

Further, according to the present configuration, the wavelength of the local oscillation light used for the detection of the received optical signal can be changed. Thus, the optical signal of the desired wavelength within a wavelength-tunable range can be demodulated. Therefore, the optical signal of a complex modulation method can be received.

Further, according to the present configuration, as the wavelength-tunable light source 21 is shared by the transmission side and the reception side, it is possible to achieve miniaturization of the wavelength-tunable pluggable optical module 300 that is transmission and reception two-in-one type. Note that, in the present exemplary embodiment, needless to say, the transmission and reception sides may each include the wavelength-tunable light source. According to the present configuration, a wavelength multiplexed optical signal may be received from the pluggable optical receptor 17. In this case, only the optical signal the wavelength of which interferes with the optical signal output from the wavelength-tunable light source 21 in the optical reception unit 18 is detected. Accordingly, the optical signal of a particular wavelength can be selectively received from the wavelength multiplexed optical signal.

Other Exemplary Embodiments

The present invention is not limited to the above-described exemplary embodiments, and can be modified as appropriate without departing from the scope of the invention. For example, in the exemplary embodiments described above, the optical communication device 92 also may perform a status request on the wavelength-tunable pluggable optical module. In this case, the control unit of the wavelength-tunable pluggable optical module receives the status request from the optical communication device 92 via the pluggable electric connector 11. The control unit of the wavelength-tunable pluggable optical module notifies the optical communication device 92 via the pluggable electric connector 11 of the operation state of the wavelength-tunable pluggable optical module when receiving the status request. Specifically, the control unit of the wavelength-tunable pluggable optical module can notify the optical communication device 92 whether or not the wavelength change operation is running. The control unit of the wavelength-tunable pluggable optical module may also notify the optical communication device 92 which processing stage of each step illustrated in FIG. 6, FIG. 8 and FIG. 11 (e.g. a state where the block of the optical signal is completed (the Step S12), a state where the wavelength change is completed (the Step S13), etc.) is running during the wavelength change operation. Further, it is possible to notify the optical communication device 92 of operation stability information of the wavelength-tunable light source and the optical modulation unit included in the optical signal output unit 13.

For example, in the exemplary embodiments described above, it can be assumed that the optical communication device 92 commands the wavelength-tunable pluggable optical module to stop the output of the optical signal while the wavelength-tunable pluggable optical module is performing the wavelength change operation. In this case, the control unit of the wavelength-tunable pluggable optical module receives the command to stop the output of the optical signal from the optical communication device 92 via the pluggable electric connector 11. However, since the wavelength-tunable pluggable optical module is under the wavelength change operation, the wavelength-tunable pluggable optical module may reject the command to stop the output of the optical signal. Therefore, occurrence of malfunction due to the overlapped operation requests can be prevented. Further, when receiving the command to stop the optical signal output from the optical communication device 92 via the pluggable electric connector 11, the optical signal output may be stopped after the wavelength change is completed. Therefore, the overlapped operation requests can be processed in order and the desired operation required by the optical communication device 92 can be robustly performed. Note that it goes without saying that the optical communication device 92 can appropriately command the wavelength-tunable pluggable optical module to start the output of the optical signal and to stop the output of the optical signal.

In the exemplary embodiments described above, it is described that the control unit of the wavelength-tunable pluggable optical module controls the wavelength-tunable light source, the optical modulation unit and the optical power adjustment unit according to the control signal CON1 from the optical communication device 92. However, it is merely an example. The control unit of the wavelength-tunable pluggable optical module can autonomously control the wavelength-tunable light source, the optical modulation unit and the optical power adjustment unit regardless of the control signal from outside.

In the exemplary embodiments described above, the communication of the control signal can be achieved by applying the technologies such as a MDIO (Management Data Input/Output) or an I2C (Inter-Integrated Circuit).

In the exemplary embodiments described above, the power of the optical signal output from the optical signal output unit may be monitored and, for example, the optical output power of the wavelength-tunable light source disposed in the optical signal output unit may be feedback-controlled. In this case, a part of the optical signal output from the optical signal output unit is branched by such as the optical demultiplexer and the branched optical signal is monitored by a light receiving device such as a photodiode. Then, the control unit can feedback-control the power of the optical signal output from the optical signal output unit by notifying the control unit of the monitoring result.

In the exemplary embodiments described above, the power of the optical signal output from the optical power adjustment unit is monitored and, for example, the optical power of the optical power adjustment unit and the optical output power of the wavelength-tunable light source disposed in the optical signal output unit may be feedback-controlled. In this case, a part of the optical signal output from the optical power adjustment unit is branched by such as the optical demultiplexer and the branched optical signal is monitored by the light receiving device such as the photodiode. Then, the control unit can feedback-control one or both of the power of the optical signal output from the optical signal output unit and the optical power adjusted by the optical power adjustment unit by notifying the control unit of the monitoring result.

In the wavelength-tunable pluggable optical module 300 according to the third exemplary embodiment described above, as in the case of the wavelength-tunable pluggable optical module 200 according to the second exemplary embodiment, the control unit 19 may notify the optical communication device 92 of the completion of the wavelength change (corresponding to the Step S24 in FIG. 8), the optical communication device 92 may command the control unit 19 to restart the output of the optical signal (corresponding to the Step S25 in FIG. 8), and the control unit 19 may cause the optical signal output unit 20 to restart the output of the optical signal according to the command to restart the output of the optical signal (corresponding to the Step S22 in FIG. 8).

In the exemplary embodiments, the case where the optical reception unit 18 receives the DP-QPSK optical signal is described. However, it is merely an example. For example, it is configured to be able to receive other modulation signals such as QAM (quadrature amplitude modulation).

While the present invention has been described above with reference to exemplary embodiments, the present invention is not limited to the exemplary embodiments stated above.

(Supplementary note 1) A wavelength-tunable pluggable optical module including: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of an optical signal that corresponds to the communication data signal; an optical power adjustment unit configured to be capable of adjusting optical power of the optical signal; a pluggable optical receptor configured to be capable of outputting the optical signal output from the optical power adjustment unit to an optical fiber, the optical fiber being insertable into and removable from the pluggable optical receptor; a control unit configured to control a wavelength change operation according to the control signal from the pluggable electric connector, in which the control unit, according to a wavelength change command included in the control signal, commands the optical power adjustment unit to block output of the optical signal, commands the optical signal output unit to change the wavelength of the optical signal after blocking the optical signal, and commands the optical power adjustment unit to output the optical signal after the wavelength change operation.

(Supplementary note 2) The wavelength-tunable pluggable optical module according to the supplementary note 1, in which the control unit notifies the optical transmission device of information about a state of the wavelength change operation, and the control unit commands the optical power adjustment unit to output the optical signal according to an output command from the optical transmission device.

(Supplementary note 3) The wavelength-tunable pluggable optical module according to the supplementary note 2, in which the control unit notifies the optical transmission device of the information about the state of the wavelength change operation according to a request of status information from the optical transmission device.

(Supplementary note 4) The wavelength-tunable pluggable optical module according to any one of the supplementary notes 1 to 3, in which the control unit commands the optical power adjustment unit to stop the output of the optical signal according to an output stop command from the optical transmission device.

(Supplementary note 5) The wavelength-tunable pluggable optical module according to the supplementary note 4, in which the control unit preferentially performs the wavelength change operation when the control unit receives the output stop command while the wavelength change operation is running.

(Supplementary note 6) The wavelength-tunable pluggable optical module according to the supplementary note 4 or 5, in which when the control unit receives the output stop command while the wavelength change operation is running, the control unit commands to stop the output of the optical signal after the wavelength change is finished.

(Supplementary note 7) A wavelength-tunable pluggable optical module including: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of a first optical signal that corresponds to the communication data signal; an optical power adjustment unit configured to be capable of adjusting optical power of the first optical signal; a first pluggable optical receptor configured to be capable of outputting the first optical signal output from the optical power adjustment unit to a first optical fiber, the first optical fiber being insertable into and removable from the first pluggable optical receptor; a control unit configured to control a wavelength change operation according to the control signal from the pluggable electric connector, a second pluggable optical receptor to which a second optical signal can be input from a second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, in which the control unit, according to a wavelength change command included in the control signal, commands the optical power adjustment unit to block output of the first optical signal, commands the optical signal output unit to change the wavelength of the first optical signal after blocking the first optical signal, and commands the optical power adjustment unit to output the first optical signal after the wavelength change operation, and the optical reception unit outputs an electric signal corresponding to the received second optical signal to the optical transmission device via the pluggable electric connector.

(Supplementary note 8) The wavelength-tunable pluggable optical module according to the supplementary note 7, in which the control unit notifies the optical transmission device of information about a state of the wavelength change operation, and the control unit commands the optical power adjustment unit to output the first optical signal according to an output command from the optical transmission device.

(Supplementary note 9) The wavelength-tunable pluggable optical module according to the supplementary note 8, in which the control unit notifies the optical transmission device of the information about the state of the wavelength change operation according to a request of status information from the optical transmission device.

(Supplementary note 10) The wavelength-tunable pluggable optical module according to any one of the supplementary notes 7 to 9, in which the control unit commands the optical power adjustment unit to stop the output of the first optical signal according to an output stop command from the optical transmission device.

(Supplementary note 11) The wavelength-tunable pluggable optical module according to the supplementary note 10, in which the control unit preferentially performs the wavelength change operation when the control unit receives the output stop command while the wavelength change operation is running.

(Supplementary note 12) The wavelength-tunable pluggable optical module according to the supplementary note 10 or 11, in which when the control unit receives the output stop command while the wavelength change operation is running, the control unit commands to stop the output of the first optical signal after the wavelength change is finished.

(Supplementary note 13) The wavelength-tunable pluggable optical module according to any one of the supplementary notes 7 to 12, in which the optical signal output unit includes: a wavelength-tunable light source; an optical demultiplexer configured to branch a light output from the wavelength-tunable light source; and an optical modulation unit configured to modulate one of the lights branched by the optical demultiplexer to output the first optical signal, and the optical reception unit causes the other of the lights branched by the optical demultiplexer to interfere with the second optical signal to receive the second optical signal.

(Supplementary note 14) The wavelength-tunable pluggable optical module according to any one of the supplementary notes 7 to 13, in which the control unit commands a reception setting according to the second optical signal to the optical reception unit after the wavelength change operation.

(Supplementary note 15) The wavelength-tunable pluggable optical module according to any one of the supplementary notes 7 to 13, in which a wavelength multiplexed optical signal including the second optical signal can be input to the second pluggable optical receptor from the second optical fiber, and the optical reception unit can selectively receive the second optical signal by causing the wavelength multiplexed optical signal to interfere with the light of the predetermined wavelength.

(Supplementary note 16) An optical communication system including: an optical fiber configured to transmit an optical signal; a wavelength-tunable pluggable optical module configured to output the optical signal to the optical fiber, the optical fiber being insertable into and removable from the wavelength-tunable pluggable optical module; and an optical transmission device configured to control the wavelength-tunable pluggable optical module, the wavelength-tunable pluggable optical module being insertable into and removable from the optical transmission device, in which the wavelength-tunable pluggable optical module includes: a pluggable electric connector configured to be capable of communicating a communication data signal and a control signal with the optical transmission device, the pluggable electric connector being insertable into and removable from the optical transmission device; an optical signal output unit configured to be capable of selectively outputting a wavelength of the optical signal that corresponds to the communication data signal; an optical power adjustment unit configured to be capable of adjusting optical power of the optical signal; a pluggable optical receptor configured to be capable of outputting the optical signal output from the optical power adjustment unit to the optical fiber, the optical fiber being insertable into and removable from the pluggable optical receptor; and a control unit configured to control a wavelength change operation according to the control signal from the pluggable electric connector, the control unit, according to a wavelength change command included in the control signal, commands the optical power adjustment unit to block output of the optical signal, commands the optical signal output unit to change the wavelength of the optical signal after blocking the optical signal, and commands the optical power adjustment unit to output the optical signal after the wavelength change operation.

(Supplementary note 17) The optical communication system according to the supplementary note 16, in which the control unit notifies the optical transmission device of information about a state of the wavelength change operation, and the control unit commands the optical power adjustment unit to output the optical signal according to an output command from the optical transmission device.

(Supplementary note 18) The optical communication system according to the supplementary note 17, in which the control unit notifies the optical transmission device of the information about the state of the wavelength change operation according to a request of status information from the optical transmission device.

(Supplementary note 19) The optical communication system according to any one of the supplementary notes 16 to 18, in which the control unit commands the optical power adjustment unit to stop the output of the optical signal according to an output stop command from the optical transmission device.

(Supplementary note 20) The optical communication system according to the supplementary note 19, in which the control unit preferentially performs the wavelength change operation when the control unit receives the output stop command while the wavelength change operation is running.

(Supplementary note 21) The optical communication system according to the supplementary note 19 or 20, in which when the control unit receives the output stop command while the wavelength change operation is running, the control unit commands to stop the output of the optical signal after the wavelength change is finished.

(Supplementary note 22) An optical communication system including: a first optical fiber and a second optical fiber configured to transmit an optical signal; a wavelength-tunable pluggable optical module configured to output a first optical signal to the first optical fiber, a second optical signal being input to the wavelength-tunable pluggable optical module from the second optical fiber, the first optical fiber and the second optical fiber being insertable into and removable from the wavelength-tunable pluggable optical module; and an optical transmission device configured to control the wavelength-tunable pluggable optical module, the wavelength-tunable pluggable optical module being insertable into and removable from the optical transmission device, in which the wavelength-tunable pluggable optical module includes: a pluggable electric connector configured to be capable of communicating a communication data signal and a control signal with the optical transmission device, the pluggable electric connector being insertable into and removable from the optical transmission device; an optical signal output unit configured to be capable of selectively outputting a wavelength of the first optical signal that corresponds to the communication data signal; an optical power adjustment unit configured to be capable of adjusting optical power of the first optical signal; a first pluggable optical receptor configured to be capable of outputting the first optical signal output from the optical power adjustment unit to the first optical fiber, the first optical fiber being insertable into and removable from the first pluggable optical receptor; a control unit configured to control a wavelength change operation according to the control signal from the pluggable electric connector, a second pluggable optical receptor to which the second optical signal can be input from the second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, wherein the control unit, according to a wavelength change command included in the control signal, commands the optical power adjustment unit to block output of the first optical signal, commands the optical signal output unit to change the wavelength of the first optical signal after blocking the first optical signal, and commands the optical power adjustment unit to output the first optical signal after the wavelength change operation, and the optical reception unit outputs an electric signal corresponding to the received second optical signal to the optical transmission device via the pluggable electric connector.

(Supplementary note 23) The optical communication system according to the supplementary note 22, in which the control unit notifies the optical transmission device of information about a state of the wavelength change operation, and the control unit commands the optical power adjustment unit to output the first optical signal according to an output command from the optical transmission device.

(Supplementary note 24) The optical communication system according to the supplementary note 23, in which the control unit notifies the optical transmission device of the information about the state of the wavelength change operation according to a request of status information from the optical transmission device.

(Supplementary note 25) The optical communication system according to any one of the supplementary notes 22 to 24, in which the control unit commands the optical power adjustment unit to stop the output of the first optical signal according to an output stop command from the optical transmission device.

(Supplementary note 26) The optical communication system according to the supplementary note 25, in which the control unit preferentially performs the wavelength change operation when the control unit receives the output stop command while the wavelength change operation is running.

(Supplementary note 27) The optical communication system according to the supplementary note 25 or 26, in which when the control unit receives the output stop command while the wavelength change operation is running, the control unit commands to stop the output of the first optical signal after the wavelength change is finished.

(Supplementary note 28) The optical communication system according to any one of the supplementary notes 22 to 27, in which the optical signal output unit includes: a wavelength-tunable light source; an optical demultiplexer configured to branch a light output from the wavelength-tunable light source; and an optical modulation unit configured to modulate one of the lights branched by the optical demultiplexer to output the first optical signal; the optical reception unit causes the other of the lights branched by the optical demultiplexer to interfere with the second optical signal to receive the second optical signal.

(Supplementary note 29) The optical communication system according to any one of the supplementary notes 22 to 28, in which the control unit commands a reception setting according to the second optical signal to the optical reception unit after the wavelength change operation.

(Supplementary note 30) The optical communication system according to any one of the supplementary notes 22 to 28, in which a wavelength multiplexed optical signal including the second optical signal can be input to the second pluggable optical receptor from the second optical fiber, and the optical reception unit can selectively receive the second optical signal by causing the wavelength multiplexed optical signal to interfere with the light of the predetermined wavelength.

(Supplementary note 31) A wavelength change method of a wavelength-tunable pluggable optical module including: in the wavelength-tunable pluggable optical module that includes: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of an optical signal that corresponds to the communication data signal an optical power adjustment unit configured to be capable of adjusting optical power of the optical signal; and a pluggable optical receptor configured to be capable of outputting the optical signal output from the optical power adjustment unit to an optical fiber, the optical fiber being insertable into and removable from the pluggable optical receptor; according to a wavelength change command included in the control signal received via the pluggable electric connector, commanding the optical power adjustment unit to block output of the optical signal, commanding the optical signal output unit to change the wavelength of the optical signal after blocking the optical signal, and commanding the optical power adjustment unit to output the optical signal after the wavelength change operation.

(Supplementary note 32) The wavelength change method of the wavelength-tunable pluggable optical module according to the supplementary note 31, in which information about a state of the wavelength change operation is notified to the optical transmission device, and the optical power adjustment unit is commanded to output the optical signal according to an output command from the optical transmission device.

(Supplementary note 33) The wavelength change method of the wavelength-tunable pluggable optical module according to the supplementary note 32, in which the information about the state of the wavelength change operation is notified to the optical transmission device according to a request of status information from the optical transmission device.

(Supplementary note 34) The wavelength change method of the wavelength-tunable pluggable optical module according to any one of the supplementary notes 31 to 33, in which the optical power adjustment unit is commanded to stop the output of the optical signal according to an output stop command from the optical transmission device.

(Supplementary note 35) The wavelength change method of the wavelength-tunable pluggable optical module according to the supplementary note 34, in which the wavelength change operation is preferentially performed when the output stop command is received while the wavelength change operation is running.

(Supplementary note 36) The wavelength change method of the wavelength-tunable pluggable optical module according to the supplementary note 34 or 35, in which when the output stop command is received while the wavelength change operation is running, it is commanded to stop the output of the optical signal.

(Supplementary note 37) A wavelength change method of a wavelength-tunable pluggable optical module including: in a wavelength-tunable pluggable optical module that includes: a pluggable electric connector configured to be capable of communicating a communication data signal and a control signal with an optical transmission device, the pluggable electric connector being insertable into and removable from the optical transmission device; an optical signal output unit configured to be capable of selectively outputting a wavelength of a first optical signal that corresponds to the communication data signal; an optical power adjustment unit configured to be capable of adjusting optical power of the first optical signal; and a first pluggable optical receptor configured to be capable of outputting the first optical signal output from the optical power adjustment unit to a first optical fiber, the first optical fiber being insertable into and removable from the first pluggable optical receptor; a second pluggable optical receptor to which a second optical signal can be input from a second optical fiber, the second optical fiber being insertable into and removable from the second pluggable optical receptor; and an optical reception unit configured to be capable of receiving by causing the second optical signal input via the second pluggable optical receptor to interfere with a light of a predetermined wavelength, causing the optical reception unit to output an electric signal corresponding to the received second optical signal to the optical transmission device via the pluggable electric connector, according to a wavelength change command included in the control signal received via the pluggable electric connector, commanding the optical power adjustment unit to block output of the first optical signal, commanding the optical signal output unit to change the wavelength of the first optical signal after blocking the first optical signal, and commanding the optical power adjustment unit to output the first optical signal after the wavelength change operation.

(Supplementary note 38) The wavelength change method of the wavelength-tunable pluggable optical module according to the supplementary note 37, in which information about a state of the wavelength change operation is notified to the optical transmission device, and the optical power adjustment unit is commanded to output the first optical signal according to an output command from the optical transmission device.

(Supplementary note 39) The wavelength change method of the wavelength-tunable pluggable optical module according to the supplementary note 38, in which the information about the state of the wavelength change operation is notified to the optical transmission device according to a request of status information from the optical transmission device.

(Supplementary note 40) The wavelength change method of the wavelength-tunable pluggable optical module according to any one of the supplementary notes 37 to 39, in which the optical power adjustment unit is commanded to stop the output of the first optical signal according to an output stop command from the optical transmission device.

(Supplementary note 41) The wavelength change method of the wavelength-tunable pluggable optical module according to the supplementary note 40, in which the wavelength change operation is preferentially performed when the output stop command is received while the wavelength change operation is running.

(Supplementary note 42) The wavelength change method of the wavelength-tunable pluggable optical module according to the supplementary note 40 or 41, in which when the output stop command is received while the wavelength change operation is running, it is commanded to stop the output of the first optical signal.

(Supplementary note 43) The wavelength change method of the wavelength-tunable pluggable optical module according to any one of the supplementary notes 37 to 42, in which the optical signal output unit includes: a wavelength-tunable light source; an optical demultiplexer configured to branch a light output from the wavelength-tunable light source; and an optical modulation unit configured to modulate one of the lights branched by the optical demultiplexer to output the first optical signal, the optical reception unit causes the other of the lights branched by the optical demultiplexer to interfere with the second optical signal to receive the second optical signal.

(Supplementary note 44) The wavelength change method of the wavelength-tunable pluggable optical module according to any one of the supplementary notes 37 to 43, in which a reception setting according to the second optical signal is commanded to the optical reception unit after the wavelength change operation.

(Supplementary note 45) The wavelength change method of the wavelength-tunable pluggable optical module according to any one of the supplementary notes 37 to 43, in which a wavelength multiplexed optical signal including the second optical signal can be input to the second pluggable optical receptor from the second optical fiber, and the optical reception unit can selectively receive the second optical signal by causing the wavelength multiplexed optical signal to interfere with the light of the predetermined wavelength.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2015-43203, filed on Mar. 5, 2015, the disclosure of which is incorporated herein in its entirety by reference.

REFERENCE SIGNS LIST

11 PLUGGABLE ELECTRIC CONNECTOR
12, 16, 19 CONTROL UNITS
13, 20 OPTICAL SIGNAL OUTPUT UNITS
14 OPTICAL POWER ADJUSTMENT UNIT
15, 17 PLUGGABLE OPTICAL RECEPTORS
18 OPTICAL RECEPTION UNIT
20 OPTICAL SIGNAL OUTPUT UNIT
21, 121 WAVELENGTH-TUNABLE LIGHT SOURCES
22 OPTICAL DEMULTIPLEXER
23, 122 OPTICAL MODULATION UNITS
31, 32 POLARIZATION BEAM SPLITTERS (PBSs)
33, 34 90-DEGREE HYBRIDS
35 DSP
41 TO 44 OPTICAL/ELECTRICAL CONVERTERS
51 TO 54 ANALOG TO DIGITAL CONVERTERS (ADCs)
91, 93 OPTICAL FIBERS
92 OPTICAL COMMUNICATION DEVICE
100, 200, 300 WAVELENGTH-TUNABLE PLUGGABLE OPTICAL MODULES
1000 OPTICAL COMMUNICATION SYSTEM
CON1 TO CON4 CONTROL SIGNALS
DAT DATA SIGNAL
IN OPTICAL SIGNAL
INF NOTIFICATION SIGNAL
L1 LIGHT
LO LOCAL OSCILLATION LIGHT
LS OPTICAL SIGNAL
MOD MODULATION SIGNAL

The invention claimed is:

1. A pluggable optical module comprising:
an electrical connector configured to connect with a host communication apparatus;
an optical connector receptacle configured to connect an optical fiber with an optical fiber connector;
a wavelength tunable light source configured to output a light;
a modulator configured to modulate the output light based on an electric signal from the host communication apparatus via the electrical connector and output an optical signal;
an optical attenuator configured to attenuate the optical signal; and
a processor configured to control a wavelength change operation in response to a wavelength change command from the host communication apparatus via the electrical connector, wherein the wavelength change operation comprises:
- the optical attenuator increases an attenuation of optical signal;
- the wavelength tunable light source changes a wavelength of the light after the optical attenuator increases the attenuation;
- the processor informs a wavelength change completion to the host communication apparatus after the wavelength tunable light source changes the wavelength of the light; and
- the optical attenuator decreases the attenuation in response to an indication from the host communication apparatus after the processor informs the wavelength change completion.

2. The pluggable optical module according to claim 1, wherein the wavelength change operation further comprises the wavelength tunable light source turns off the light after the optical attenuator increases the attenuation.

3. The pluggable optical module according to claim 2, wherein the wavelength change operation further comprises the wavelength tunable light source turns on a second light after the wavelength tunable light source changes the wavelength of the light.

4. The pluggable optical module according to claim 1, wherein the processor informs a state of the pluggable optical module to the host communication apparatus in response to a request from the host communication apparatus.

5. The pluggable optical module according to claim 1, wherein the processor informs a completion of an increase of the attenuation to the host communication apparatus after the optical attenuator increases the attenuation.

6. The pluggable optical module according to claim 1, further comprising:
- an optical splitter configured to split the light; and
- a coherent optical receiver configured to receive a received optical signal by an interference with the split light.

7. The pluggable optical module according to claim 6, wherein the processor is further configured to set a configuration of the coherent optical receiver after the wavelength tunable light source changes the wavelength of the light.

8. The pluggable optical module according to claim 1, wherein the optical attenuator is configured to output the optical signal to the optical fiber.

9. A communication system comprising:
- an optical fiber with an optical fiber connector;
- a pluggable optical module; and
- a host communication apparatus configured to control the pluggable optical module, wherein
- the pluggable optical module comprises:
  - an electrical connector configured to connect with the host communication apparatus;
  - an optical connector receptacle configured to connect the optical fiber with the optical fiber connector;
  - a wavelength tunable light source configured to output a light;
  - a modulator configured to modulate the output light based on an electric signal-from the host communication apparatus via the electrical connector and output an optical signal;
  - an optical attenuator configured to attenuate the optical signal; and
  - a processor configured to control a wavelength change operation in response to a wavelength change command from the host communication apparatus via the electrical connector, wherein the wavelength change operation comprises:
- the optical attenuator increases an attenuation of optical signal;
- the wavelength tunable light source changes a wavelength of the light after the optical attenuator increases the attenuation;
- the processor informs a wavelength change completion to the host communication apparatus after the wavelength tunable light source changes the wavelength of the light; and
- the optical attenuator decreases the attenuation in response to an indication from the host communication apparatus after the processor informs the wavelength change completion.

10. The communication system according to claim 9, wherein the wavelength change operation further comprises the optical light source turns off the light after the optical attenuator increases the attenuation.

11. The communication system according to claim 10, wherein the wavelength change operation further comprises the wavelength tunable light source turns on a second light after the wavelength tunable light source changes the wavelength of the light.

12. The communication system according to claim 9, wherein the processor informs a state of the pluggable optical module to the host communication apparatus in response to a request from the host communication apparatus.

13. The communication system according to claim 9, wherein the processor informs a completion of an increase of the attenuation to the host communication apparatus after the optical attenuator increases the attenuation.

14. The communication system according to claim 9, further comprising:
- an optical splitter configured to split the light; and
- a coherent optical receiver configured to receive a received optical signal by an interference with the split light.

15. The communication system according to claim 14, wherein the processor is further configured to set a configuration of the coherent optical receiver after the wavelength tunable source changes the wavelength of the light.

16. The communication system according to claim 9, wherein the optical attenuator is configured to output the optical signal to the optical fiber.

17. An optical communication method comprising:
- outputting a light;
- modulating the output light based on an electric signal from a host communication apparatus via an electrical connector and outputting an optical signal;
- attenuating the optical signal; and
- controlling a wavelength change operation in response to a wavelength change command from the host communication apparatus via the electrical connector, wherein
- the wavelength change operation comprises:
  - increasing an attenuation of the optical signal;
  - changing a wavelength of the light after increasing the attenuation;
  - informing a wavelength change completion to the host communication apparatus after changing the wavelength of the light; and
  - decreasing the attenuation in response to an indication from the host communication apparatus after informing the wavelength change completion.

18. The optical communication method according to claim 17, wherein the wavelength change operation further comprises turning off the light after increasing the attenuation.

19. The optical communication method according to claim 18, wherein the wavelength change operation further comprises turning on the light after changing the wavelength of the light.

20. The optical communication method according to claim 17, further comprising of informing a state of the optical communication to the host communication apparatus in response to a request from the host communication apparatus.

21. The optical communication method according to claim 17, further comprising of informing a completion of an increase of the attenuation to the host communication apparatus after increasing the attenuation.

22. The optical communication method according to claim 17, further comprising:
   splitting the light; and
   receiving a received optical signal by an interference with the split light.

23. The optical communication method according to claim 17, further comprising: setting a configuration of a coherent optical receiver after the wavelength change operation changes the wavelength of the light.

24. The optical communication method according to claim 17, wherein the optical signal is output to an optical fiber.

* * * * *